(12) United States Patent
Zhang et al.

(10) Patent No.: US 11,612,803 B2
(45) Date of Patent: Mar. 28, 2023

(54) BILATERAL LIMB COORDINATION TRAINING SYSTEM AND CONTROL METHOD

(71) Applicant: SOUTHERN UNIVERSITY OF SCIENCE AND TECHNOLOGY, Shenzhen (CN)

(72) Inventors: Mingming Zhang, Shenzhen (CN); Kaiya Chu, Shenzhen (CN)

(73) Assignee: SOUTHERN UNIVERSITY OF SCIENCE AND TECHNOLOGY, Shenzhen (CN)

(*) Notice: Subject to any disclaimer, the term of this patent is extended or adjusted under 35 U.S.C. 154(b) by 0 days.

(21) Appl. No.: 17/790,919

(22) PCT Filed: Apr. 2, 2020

(86) PCT No.: PCT/CN2020/082931
§ 371 (c)(1),
(2) Date: Jul. 5, 2022

(87) PCT Pub. No.: WO2021/000614
PCT Pub. Date: Jan. 7, 2021

(65) Prior Publication Data
US 2023/0044898 A1    Feb. 9, 2023

(30) Foreign Application Priority Data
Jul. 2, 2019 (CN) .......................... 201910591310.8

(51) Int. Cl.
*A63B 71/06* (2006.01)
*G06F 3/16* (2006.01)
(Continued)

(52) U.S. Cl.
CPC .... *A63B 71/0622* (2013.01); *A63B 23/03541* (2013.01); *A63B 24/0062* (2013.01);
(Continued)

(58) Field of Classification Search
CPC .......... A63B 23/03541; A63B 24/0062; A63B 71/0622; A63B 2024/0096;
(Continued)

(56) References Cited

U.S. PATENT DOCUMENTS 5,466,213 A * 11/1995 Hogan ................... A61H 1/02
482/901
8,038,579 B2 * 10/2011 Wei ....................... A61B 5/224
601/33
(Continued)

FOREIGN PATENT DOCUMENTS

CN    204207994 U    3/2015
CN    107224385 A    10/2017
(Continued)

OTHER PUBLICATIONS

Translated first office action, application 201910591310.8. pp. 1-7.
(Continued)

*Primary Examiner* — Joshua Lee
(74) *Attorney, Agent, or Firm* — George McGuire

(57) ABSTRACT

Provided are a bilateral limb coordination training system and a bilateral limb coordination training control method. The bilateral limb coordination training control method includes: detecting, by a force sensor, force information of a three degree-of-freedom bilateral motion mechanism and sending the force information to a main controller; determining, by the main controller, target motion information of the three degree-of-freedom bilateral motion mechanism of a robot according to the force information; and controlling, by the main controller, the three degree-of-freedom bilateral motion mechanism to perform a corresponding motion based on the target motion information and sending training data and running status information generated during training to an upper computer; where a training instruction includes a bilateral non-association motion training instruc-
(Continued)

tion, a bilateral flexible-association motion training instruction or a bilateral rigid-association motion training instruction.

10 Claims, 7 Drawing Sheets

(51) Int. Cl.
*G06F 3/01* (2006.01)
*A63B 23/035* (2006.01)
*A63B 24/00* (2006.01)

(52) U.S. Cl.
CPC ............... *G06F 3/011* (2013.01); *G06F 3/16* (2013.01); *A63B 2024/0096* (2013.01); *A63B 2071/063* (2013.01); *A63B 2071/0647* (2013.01); *A63B 2214/00* (2020.08); *A63B 2220/51* (2013.01); *G06F 2203/013* (2013.01)

(58) Field of Classification Search
CPC ...... A63B 2071/063; A63B 2071/0647; A63B 2214/00; A63B 2220/51; G06F 3/011; G06F 3/16; G06F 2203/013
See application file for complete search history.

(56) References Cited

U.S. PATENT DOCUMENTS

| | | | |
|---|---|---|---|
| 9,265,685 B1 | 2/2016 | McAmis et al. | |
| 10,058,729 B2* | 8/2018 | Choi | A61H 1/0274 |
| 10,292,889 B1* | 5/2019 | McAmis | A63B 21/4035 |
| 10,350,448 B2* | 7/2019 | Weisz | A63B 24/0062 |
| 10,596,056 B2* | 3/2020 | Hou | A63B 21/4035 |
| 10,894,179 B2* | 1/2021 | Sugihara | A63B 21/151 |
| 2003/0028130 A1* | 2/2003 | Wunderly | A61H 1/0274 482/4 |
| 2011/0300994 A1* | 12/2011 | Verkaaik | G06F 3/03 482/51 |
| 2016/0000633 A1* | 1/2016 | An | A61H 1/0277 601/33 |
| 2016/0271438 A1* | 9/2016 | Weisz | A63B 21/159 |
| 2017/0209327 A1* | 7/2017 | Hou | A63B 23/03525 |

FOREIGN PATENT DOCUMENTS

| | | |
|---|---|---|
| CN | 107261417 A | 10/2017 |
| CN | 107812360 A | 3/2018 |
| CN | 107899198 A | 4/2018 |
| CN | 207462308 U | 6/2018 |
| CN | 109091819 A | 12/2018 |
| CN | 109172257 A | 1/2019 |
| CN | 110292748 A | 10/2019 |
| EP | 2087926 A1 | 8/2009 |
| EP | 2349500 B1 | 8/2018 |
| TW | 201119709 A | 6/2011 |
| WO | 2006047753 A2 | 5/2006 |

OTHER PUBLICATIONS

First Search Report, application 201910591310.8. p. 1 of 1.
International Search Report of PCT/CN2020/082931. Mailing Date of Search Report, dated Jun. 30, 2020. pp. 1-6.

\* cited by examiner

BILATERAL LIMB COORDINATION TRAINING SYSTEM AND CONTROL METHOD

CROSS-REFERENCE TO RELATED APPLICATIONS

This is a National Stage Application filed under 35 U.S.C. 371 based on International Patent Application No. PCT/CN2020/082931, filed on Apr. 2, 2020, which claims priority to Chinese Patent Application No. 201910591310.8 filed with the China National Intellectual Property Administration (CNIPA) on Jul. 2, 2019, the contents of which are incorporated herein by reference in their entireties.

TECHNICAL FIELD

The present application relates to the technical field of robots, for example, a bilateral limb coordination training system and a bilateral limb coordination training control method.

BACKGROUND

Coordination refers to an ability of the left and right sides of a human body to perform smooth, accurate and controllable movements. The development of motor function is closely related to the development of brain morphology and function. Limb coordination training, especially upper limb coordination training, is conducive to developing brain areas and reconstructing brain functions, ensuring the normal movement of upper limbs.

With the accelerated aging process in China, more and more people have limb motor dysfunctions since middle-aged and elderly people suffer from hemiplegia caused by cardiovascular and cerebrovascular diseases. Meanwhile, with the continuous development of transportation, more and more patients receive limb injuries from traffic accidents. For patients with limb dysfunctions, in addition to necessary surgery and medical treatment in an early stage, scientific rehabilitation training in a later stage is also critical for the recovery of limb functions. Currently, most conventional rehabilitation robots for rehabilitation training are unilateral limb rehabilitation training robots and cannot provide patients with bilateral coordination training. Additionally, with the accelerated pace of life, people work over desks for a long time and lack necessary limb movement. With an increasingly small range of limb movement, people suffer from corresponding diseases such as function degradation. Moreover, people hardly perform bilateral limb coordination training in daily life and there is a lack of corresponding bilateral coordination training equipment.

SUMMARY

The present application provides a bilateral limb coordination training system and a bilateral limb coordination training control method, to be applicable to bilateral limb coordination training of all people and improve a bilateral coordination motion capability of limbs.

The present application provides a bilateral limb coordination training system. The system includes a main controller, a force sensor and a robot, where the main controller is connected to the force sensor and the robot, separately.

The robot includes a base and a three degree-of-freedom bilateral motion mechanism.

The force sensor is connected to the three degree-of-freedom bilateral motion mechanism and configured to detect force information of the three degree-of-freedom bilateral motion mechanism and send the force information to the main controller.

The main controller is configured to determine target motion information of the three degree-of-freedom bilateral motion mechanism according to the force information and control the three degree-of-freedom bilateral motion mechanism to move based on the target motion information.

The present application provides a bilateral limb coordination training control method. The method is applied by the main controller in the bilateral limb coordination training system according to any embodiment of the present application and includes the steps described below.

The main controller receives the force information of the three degree-of-freedom bilateral motion mechanism detected by the force sensor.

The main controller determines the target motion information of the three degree-of-freedom bilateral motion mechanism of the robot according to the force information.

The main controller controls the three degree-of-freedom bilateral motion mechanism to perform a corresponding motion based on the target motion information.

DETAILED DESCRIPTION

The present application is further described in detail hereinafter in conjunction with the drawings and embodi-

Embodiment One

Figure 1A:
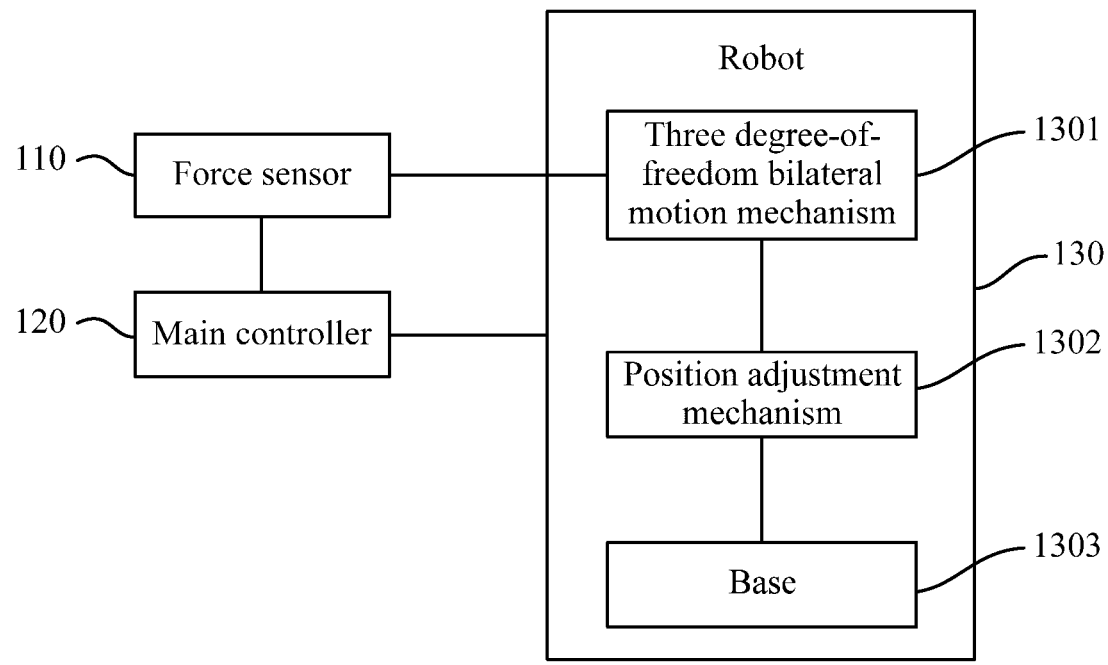
FIG. 1A is a schematic diagram of a bilateral limb coordination training system according to embodiment one of the present application.

FIG. 1A is a schematic diagram of a bilateral limb coordination training system according to embodiment one of the present application. The embodiment is applicable to bilateral limb coordination training of all people, where the bilateral limb coordination training may be bilateral upper limb coordination training or bilateral lower limb coordination training. As shown in FIG. 1A, the bilateral limb coordination training system includes a main controller 120, a force sensor 110 and a robot 130.

The main controller 120 is connected to the force sensor 110 and the robot 130, separately.

Figure 1B:
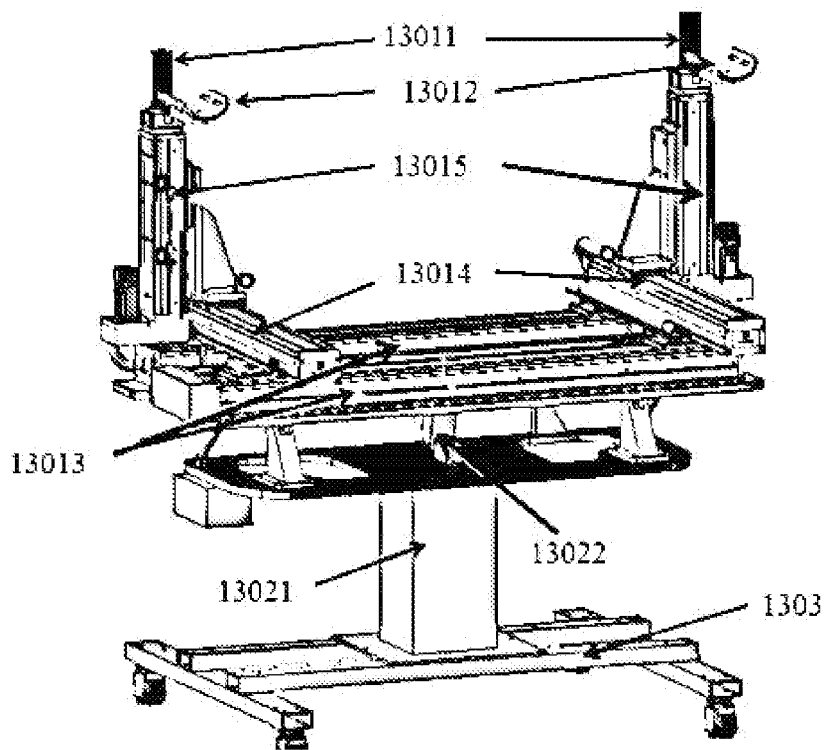
FIG. 1B is a schematic diagram of a mechanical structure of a robot according to embodiment one of the present application.

The robot 130 includes a base 1303 and a three degree-of-freedom bilateral motion mechanism 1301. The robot 130 may be a bilateral coordination training robot. For example, the bilateral coordination training robot may include a bilateral rectangular coordinate robot, a bilateral robotic arm, a bilateral parallel robot or the like. As shown in FIG. 1B, FIG. 1B shows a schematic diagram of a mechanical structure of the robot in the embodiment of the present application. In the embodiment of the present application, the bilateral coordination training robot is used as an example. When the bilateral coordination training robot is referred to, it represents the robot 130. It is to be noted that in the embodiment of the present application, the bilateral coordination training robot is merely used as an example, and the robot is not limited to the bilateral coordination training robot.

The three degree-of-freedom bilateral motion mechanism 1301 is coupled to the base 1303 and includes a pair of X-axis motion modules 13013, a pair of Y-axis motion modules 13014, a pair of Z-axis motion modules 13015, support stages 13012 and end effectors 13011, where the support stages 13012 and the end effectors 13011 are connected by screws to ends of the Z-axis motion modules 13015 away from the Y-axis motion modules 13014.

The end effector 13011 may be an operation handle. In the embodiment of the present application, the operation handle is used as an example. When the operation handle is referred to, it represents the end effector 13011. It is to be noted that in the embodiment of the present application, the operation handle is merely an example, and the end effector is not limited to the operation handle.

The operation handle 13011 may include two handles connected to the ends of the pair of Z-axis motion modules 13015 away from the Y-axis motion modules 13014, separately. Two support stages 13012 are provided, which correspond to two operation handles 13011 in a one-to-one manner. The support stages 13012 may be wrist support stages. When the X-axis motion module 13013, the Y-axis motion module 13014 and the Z-axis motion module 13015 included in each group are located at origins of their respective coordinate axes, a Cartesian left-hand coordinate system is established with the center point of the top of the operation handle 13011 on a left side in FIG. 1B as an origin, where a positive direction of an x axis points toward the operation handle 13011 on a right side; and a Cartesian right-hand coordinate system is established with the center point of the top of the operation handle 13011 on the right side as an origin, where a positive direction of an x axis points toward the operation handle 13011 on the left side.

The three degree-of-freedom bilateral motion mechanism 1301 may also be coupled to the base 1303 through a position adjustment mechanism 1302. The position adjustment mechanism 1302 includes a lifting column 13021, a lifting platform and an electric push rod 13022.

The lifting column 13021 is fixed to the base 1303 and coupled to a metal plate.

In an embodiment, one end of the lifting column 13021 is fixed to the base 1303, the other end of the lifting column 13021 is connected to one side of the lifting platform, and the lifting column 13021 is configured to adjust the height of the three degree-of-freedom bilateral motion mechanism 1301. The electric push rod 13022 is disposed on a bottom surface of the three degree-of-freedom bilateral motion mechanism 1301, one end of the electric push rod 13022 is coupled to the metal plate on the bottom surface of the three degree-of-freedom bilateral motion mechanism 1301, the other end of the electric push rod 13022 is connected to the other side of the lifting platform, and the electric push rod 13022 is configured to adjust an angle at which the three degree-of-freedom bilateral motion mechanism 1301 is inclined. The lifting column 13021 and the electric push rod 13022 are adjusted, to improve the comfort of a trainee when the trainee performs bilateral coordination training using the bilateral coordination training robot 130.

The force sensor 110 is connected to the three degree-of-freedom bilateral motion mechanism 1301 and configured to detect force information of the three degree-of-freedom bilateral motion mechanism 1301 and send the force information to the main controller 120. In an embodiment, the force sensor 110 may include a force sensor and a companion signal amplifier. The force sensor collaborates with the signal amplifier to detect the force information of the three degree-of-freedom bilateral motion mechanism 1301 and send the force information to the main controller 120.

Force sensors 110 are connected in one-to-one correspondence to the operation handles 13011 in the three degree-of-freedom bilateral motion mechanism 1301 and configured to detect magnitudes and directions of forces acted on the corresponding operation handles 13011 during the bilateral coordination training.

The force sensor 110 on the left side among the force sensors 110 is connected to the operation handle 13011 on the left side of the trainee and configured to detect a magnitude and a direction of a force acted on the corresponding operation handle 13011 on the left side and send the magnitude and the direction to the main controller 120. The force sensor 110 on the right side among the force sensors 110 is connected to the operation handle 13011 on the right side of the trainee and configured to detect a magnitude and a direction of a force acted on the corresponding operation handle 13011 on the right side and send the magnitude and the direction of the force to the main controller 120. The magnitude of the force may be a magnitude of a resultant force of forces applied by the trainee on the operation handle 13011 along the x axis, y axis and z axis of the coordinate system. The direction of the force may be a direction of the resultant force of the forces applied by the trainee on the operation handle 13011 along the x axis, y axis and z axis of the coordinate system.

The main controller 120 is configured to determine target motion information of the three degree-of-freedom bilateral motion mechanism 1301 according to the force information and control the three degree-of-freedom bilateral motion mechanism 1301 to move based on the target motion information. In an embodiment, the main controller 120 may be a CompactRIO-9047 controller manufactured by National Instruments (NI) Corporation.

The main controller 120 determines motion displacements of each X-axis motion module 13013, each Y-axis motion module 13014 and each Z-axis motion module 13015 according to the magnitudes and the directions of the forces acted on the corresponding operation handles 13011, the magnitudes and the directions being fed back by the force sensors 110; and the main controller 120 controls each X-axis motion module 13013, each Y-axis motion module 13014 and each Z-axis motion module 13015 to move according to the corresponding motion displacements.

The main controller 120 performs data processing according to the magnitudes and the directions of the forces acted on the corresponding operation handles 13011, the magnitudes and the directions being fed back by the force sensors 110 on the left and right sides, and then controls the three degree-of-freedom bilateral motion mechanism 1301 of the bilateral coordination training robot 130 to move in three different motion modes, which are a bilateral non-association motion, a bilateral flexible-association motion and a bilateral rigid-association motion, separately.

The bilateral non-association motion refers to no association between the magnitudes and the directions of the forces acted on the operation handles 13011 on the left and right sides on the premise of no collision between the operation handles 13011 on the left and right sides. The corresponding bilateral non-association motion control strategy is described below. The trainee applies the forces to the operation handles 13011 on the left and right sides, separately. The force sensors 110 on the left and right sides detect the magnitudes and the directions of the forces acted on the corresponding operation handles 13011 on the left and right sides and send the magnitudes and the directions of the forces to the main controller 120. The main controller 120 calculates the motion displacements of the corresponding X-axis motion modules 13013, Y-axis motion modules 13014 and Z-axis motion modules 13015 according to the magnitudes and the directions of the forces acted on the operation handles 13011 on the left and right sides and controls each X-axis motion module 13013, each Y-axis motion module 13014 and each Z-axis motion module 13015 to move according to the corresponding motion displacements.

The bilateral flexible-association motion refers to the simulation of a simulated physical internal force between the operation handles 13011 on the left and right sides on the premise of no collision between the operation handles 13011 on the left and right sides. The simulated physical internal force is determined according to an object simulated by the operation handles 13011 on the left and right sides. For example, the operation handles 13011 on the left and right sides are simulated as a chest expander, and simulated handles of the chest expander are connected by a spring, so the simulated physical internal force is a force applied by the spring on the simulated handles 13011 on the left and right sides. In this case, the magnitudes and the directions of the forces acted on the operation handles 13011 on the left and right sides are flexibly associated through the simulated physical internal force. The corresponding bilateral flexible-association motion control strategy is described below. The trainee applies the forces to the operation handles 13011 on the left and right sides, separately. The force sensors 110 on the left and right sides detect the magnitudes and the directions of the forces acted on the corresponding operation handles 13011 on the left and right sides and send the magnitudes and the directions to the main controller 120. The main controller 120 calculates the simulated physical internal force between the operation handles 13011 on the left and right sides according to actual position coordinates of the operation handles 13011 on the left and right sides, calculates the motion displacements of the corresponding X-axis motion modules 13013, Y-axis motion modules 13014 and Z-axis motion modules 13015 according to the calculated simulated physical internal force and the magnitudes and the directions of the forces acted on the operation handles 13011 on the left and right sides, the magnitudes and the directions being sent by the force sensors 110, and controls each X-axis motion module 13013, each Y-axis motion module 13014 and each Z-axis motion module 13015 to move according to the corresponding motion displacements.

The bilateral rigid-association motion refers to the simulation of a rigid connection between the operation handles 13011 on the left and right sides on the premise of no collision between the operation handles 13011 on the left and right sides, and relative positions of the operation handles 13011 on the left and right sides remain unchanged in the process of controlling the three degree-of-freedom bilateral motion mechanism 1301 to move. The corresponding bilateral rigid-association motion control strategy is described below. The trainee applies the forces to the operation handles 13011 on the left and right sides, separately. The force sensors 110 on the left and right sides detect the magnitudes and the directions of the forces acted on the corresponding operation handles 13011 on the left and right sides and send the magnitudes and the directions to the main controller 120. The main controller 120 calculates resultant forces acted on the operation handles 13011 on the left and right sides according to the magnitudes and the directions of the forces acted on the operation handles 13011 on the left and right sides, calculates the motion displacements of the corresponding X-axis motion modules 13013, Y-axis motion modules 13014 and Z-axis motion modules 13015 according to the resultant forces, and controls each X-axis motion module 13013, each Y-axis motion module 13014 and each Z-axis motion module 13015 to move according to the corresponding motion displacements.

According to the embodiment of the present application, the robot provided with the three degree-of-freedom bilateral motion mechanism is connected to the force sensor and the main controller, and the main controller determines the target motion information of the three degree-of-freedom bilateral motion mechanism according to the force information of the three degree-of-freedom bilateral motion mechanism detected by the force sensor and controls the three degree-of-freedom bilateral motion mechanism to move based on the target motion information. The present application solves the problem of a lack of equipment applicable to the bilateral coordination training of all people and not only enables people having limb motor dysfunction to perform rehabilitation training and bilateral coordination training to reconstruct brain functions but also enables ordinary people to perform bilateral coordination training to improve a limb coordination motion capability and develop brain areas.

Embodiment Two

Figure 2:
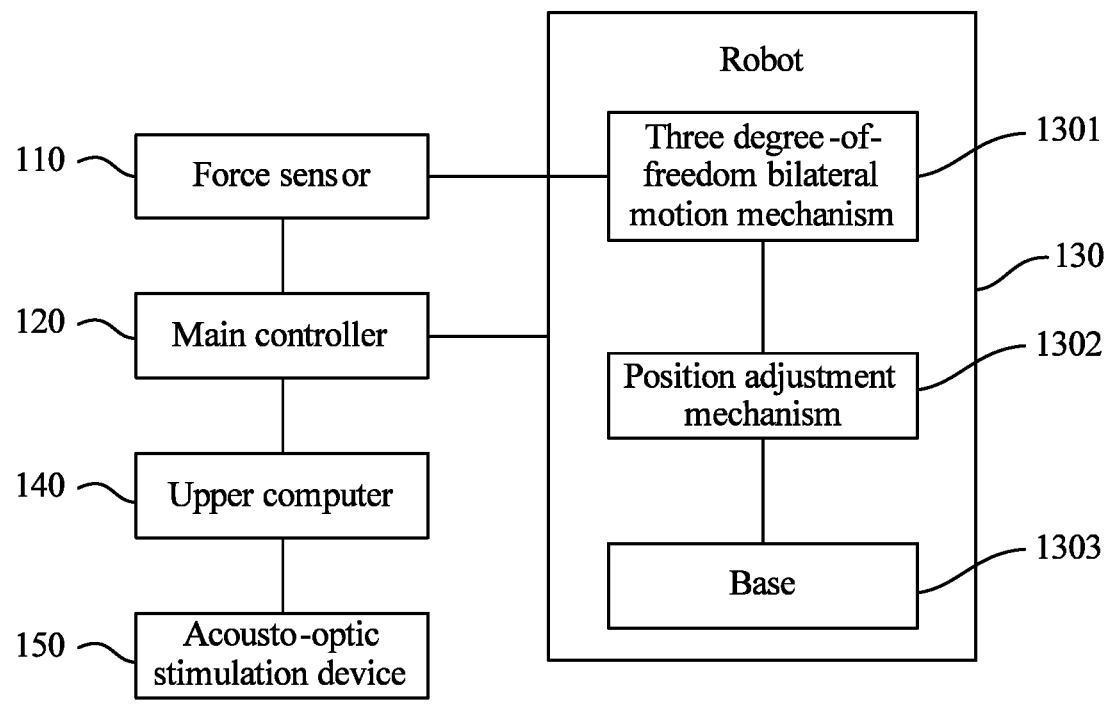
FIG. 2 is a schematic diagram of a bilateral limb coordination training system according to embodiment two of the present application.

FIG. 2 is a schematic diagram of a bilateral limb coordination training system according to embodiment two of the present application. Based on the preceding embodiment, the bilateral limb coordination training system further includes an upper computer 140 and an acousto-optic stimulation device 150. As shown in FIG. 2, the bilateral limb coordination training system includes a main controller 120, a force sensor 110, a bilateral coordination training robot 130, the upper computer 140 and the acousto-optic stimulation device 150.

The main controller 120 is connected to the force sensor 110 and the bilateral coordination training robot 130, separately, the upper computer 140 is connected to the main controller 120, and the acousto-optic stimulation device 150 is connected to the upper computer 140.

The bilateral coordination training robot 130 includes a base 1303, a position adjustment mechanism 1302 fixed to the base and a three degree-of-freedom bilateral motion mechanism 1301 coupled through a metal plate.

The force sensor 110 is connected to the three degree-of-freedom bilateral motion mechanism 1301 and configured to detect force information of the three degree-of-freedom bilateral motion mechanism 1301 and send the force information to the main controller 120.

The main controller 120 is configured to determine target motion information of the three degree-of-freedom bilateral motion mechanism 1301 according to the force information and control the three degree-of-freedom bilateral motion mechanism 1301 to move based on the target motion information.

The upper computer 140 may be configured to deliver a training instruction to the main controller 120 to wake up the main controller 120 and is further configured to receive training data and running status information fed back by the main controller 120. In an embodiment, the upper computer 140 may be a personal computer (PC). The upper computer 140 may communicate with the main controller 120 via an application programming interface (API).

The training instruction delivered by the upper computer 140 to the main controller 120 includes a bilateral non-association motion training instruction, a bilateral flexible-association motion training instruction or a bilateral rigid-association motion training instruction. After the upper computer 140 delivers the bilateral non-association motion training instruction to the main controller 120, the main controller 120 controls the three degree-of-freedom bilateral motion mechanism 1301 in the bilateral coordination training robot 130 to perform a bilateral non-association motion. After the upper computer 140 delivers the bilateral flexible-association motion training instruction to the main controller 120, the main controller 120 controls the three degree-of-freedom bilateral motion mechanism 1301 in the bilateral coordination training robot 130 to perform a bilateral flexible-association motion. After the upper computer 140 delivers the bilateral rigid-association motion training instruction to the main controller 120, the main controller 120 controls the three degree-of-freedom bilateral motion mechanism 1301 in the bilateral coordination training robot 130 to perform a bilateral rigid-association motion.

Based on the preceding embodiment, the three degree-of-freedom bilateral motion mechanism 1301 in the bilateral coordination training robot 130 has three different motion modes. According to a motion mode selected by a trainee, the upper computer 140 delivers the corresponding training instruction to the main controller 120 so that the main controller 120 controls the different motion modes to implement the bilateral non-association motion, the bilateral flexible-association motion or the bilateral rigid-association motion. During the motion, the main controller 120 feeds back the training data and the running status information to the upper computer 140 in real time. The upper computer 140 may monitor a system running status in the entire training process according to the running status information, store the training data at the end of training, and effectively evaluate a training effect of the trainee through the training data.

The acousto-optic stimulation device 150 is configured to provide the trainee with audio and image information such that the trainee performs bilateral coordination training with the bilateral coordination training robot 130 according to the audio and image information; and the acousto-optic stimulation device 150 is further configured to receive current motion information of the bilateral coordination training robot 130 fed back by the upper computer 140 and display the current motion information in an image form.

The acousto-optic stimulation device 150 includes a speaker having left and right channels, a display screen and an acousto-optic controller connected to the upper computer 140.

The acousto-optic controller controls the speaker to play training guiding audio and controls the display screen to display a training guiding picture such that the trainee enters a corresponding training mode. In an embodiment, the acousto-optic controller may control the speaker having the left and right channels to play different degrees of sound stimulation to guide the trainee for training in different modes.

Figure 3A:
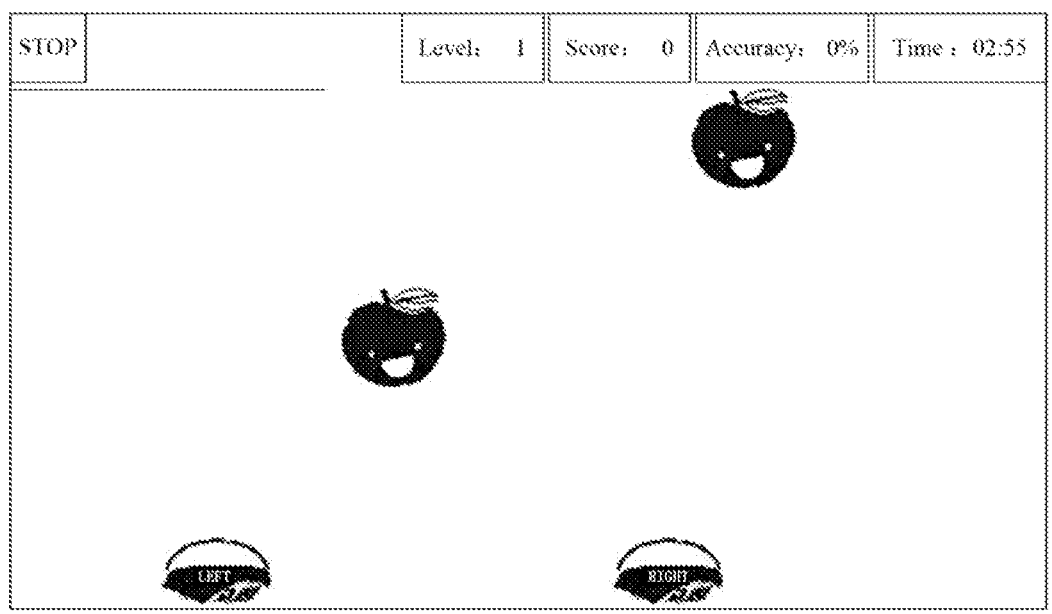
FIG. 3A is a guiding picture of a bimanual coordination apple-pickup training game corresponding to a bilateral non-association motion according to embodiment two of the present application.
Figure 3B:
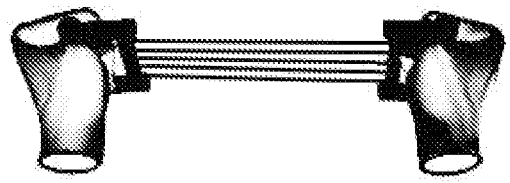
FIG. 3B is a guiding picture of a simulated chest expander training game corresponding to a bilateral flexible-association motion according to embodiment two of the present application.
Figure 3C:
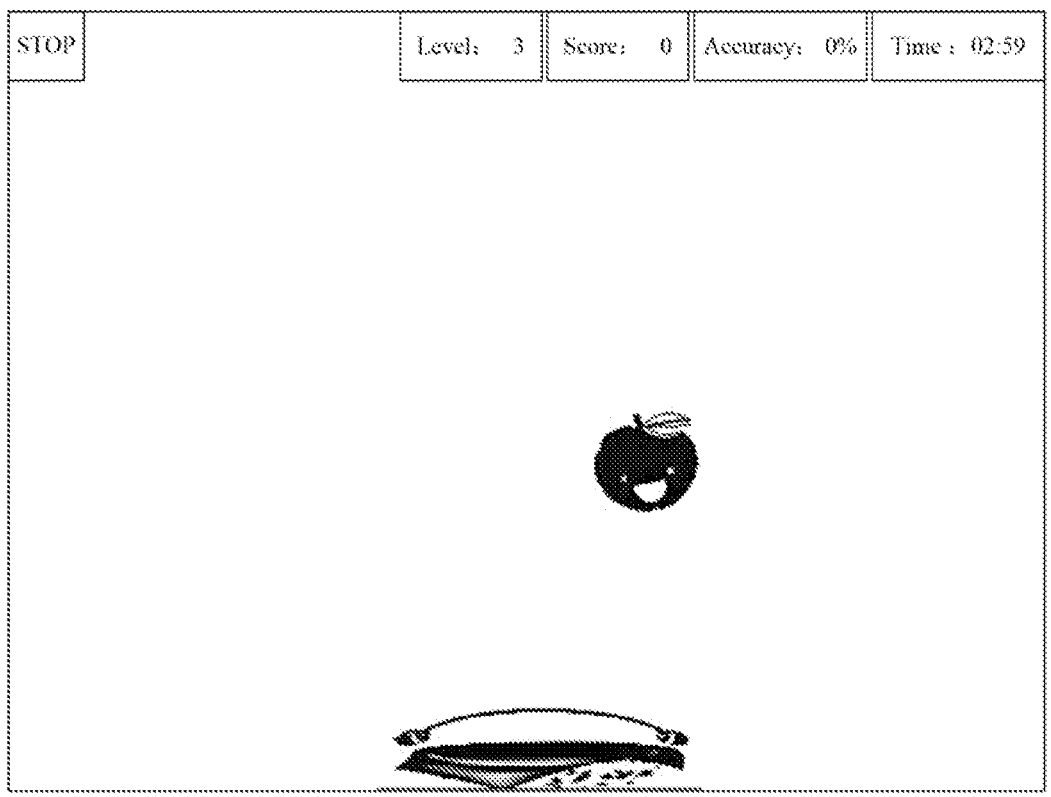
FIG. 3C is a guiding picture of a simulated rigid object movement training game corresponding to a bilateral rigid-association motion according to embodiment two of the present application.

The bilateral non-association motion, the bilateral flexible-association motion and the bilateral rigid-association motion are simulated as the following three different games: a bimanual coordination apple-pickup training game, a simulated chest expander training game and a simulated rigid object movement training game, separately. The upper computer 140 presets corresponding training parameters such that the acousto-optic stimulation device 150 displays the training guiding picture according to the training parameters preset by the upper computer 140, as shown in FIG. 3A, FIG. 3B and FIG. 3C.

The upper computer 140 further presets training parameters corresponding to the three different motion modes. After the trainee selects one motion mode on an initial display page of the upper computer 140, the upper computer 140 sends training parameters corresponding to the one motion mode to the acousto-optic stimulation device 150 and the acousto-optic stimulation device 150 displays the training guiding picture according to the training parameters preset by the upper computer 140 such that the trainee enters the corresponding training mode. The preset training parameters corresponding to the three different motion modes may include information about picture parameters to be displayed by the acousto-optic stimulation device 150. For example, in the bimanual coordination apple-pickup training game, two apples randomly falling in a left half plane and a right half plane and images of the corresponding two baskets for picking up the apples are displayed by the acousto-optic stimulation device 150. In the simulated chest expander training game, an image of a simulated chest expander is displayed by the acousto-optic stimulation device 150. In the simulated rigid object movement training game, one apple randomly falling and an image of the corresponding basket for picking up the apple are displayed by the acousto-optic stimulation device 150. For the bimanual coordination apple-pickup training game and the simulated rigid object movement training game, the upper computer 140 may also preset training parameters such as a game difficulty coefficient, a game score, an accuracy rate and a game countdown.

The bilateral limb coordination training system may further include a limit switch, an air switch and a power supply.

The limit switch is configured to limit motion ranges of the X-axis motion modules 13013, the Y-axis motion modules 13014 and the Z-axis motion modules 13015 to ensure that the bilateral coordination training robot 130 moves within a safety range.

The air switch is configured to prevent the trainee from a danger caused by an accidental electric shock.

The power supply may include a 220V alternating current (AC) to 24V direct current (DC) switching power supply and a 220V AC to 48V DC switching power supply. The 220V AC to 24V DC switching power supply is configured to supply power with a band brake to the main controller 120, the limit switch and a servo motor in the bilateral coordination training robot 130. The 220V AC to 48V DC switching power supply is configured to supply power to the servo motor in the bilateral coordination training robot 130.

According to the embodiment of the present application, the bilateral limb coordination training system is composed of the robot provided with the three degree-of-freedom bilateral motion mechanism, the force sensor, the main controller, the upper computer and the acousto-optic stimulation device. The present application solves the problem of a lack of equipment applicable to the bilateral coordination training of all people and not only enables people having limb motor dysfunction to perform rehabilitation training and bilateral coordination training to reconstruct brain functions but also enables ordinary people to perform bilateral coordination training to improve a limb coordination motion capability and develop brain areas.

Embodiment Three

Based on the preceding embodiments, control flows of bilateral non-association motion training, bilateral flexible-association motion training and bilateral rigid-association motion training performed using a bilateral limb coordination training system are described in more detail in the embodiment of the present application.

Figure 4:
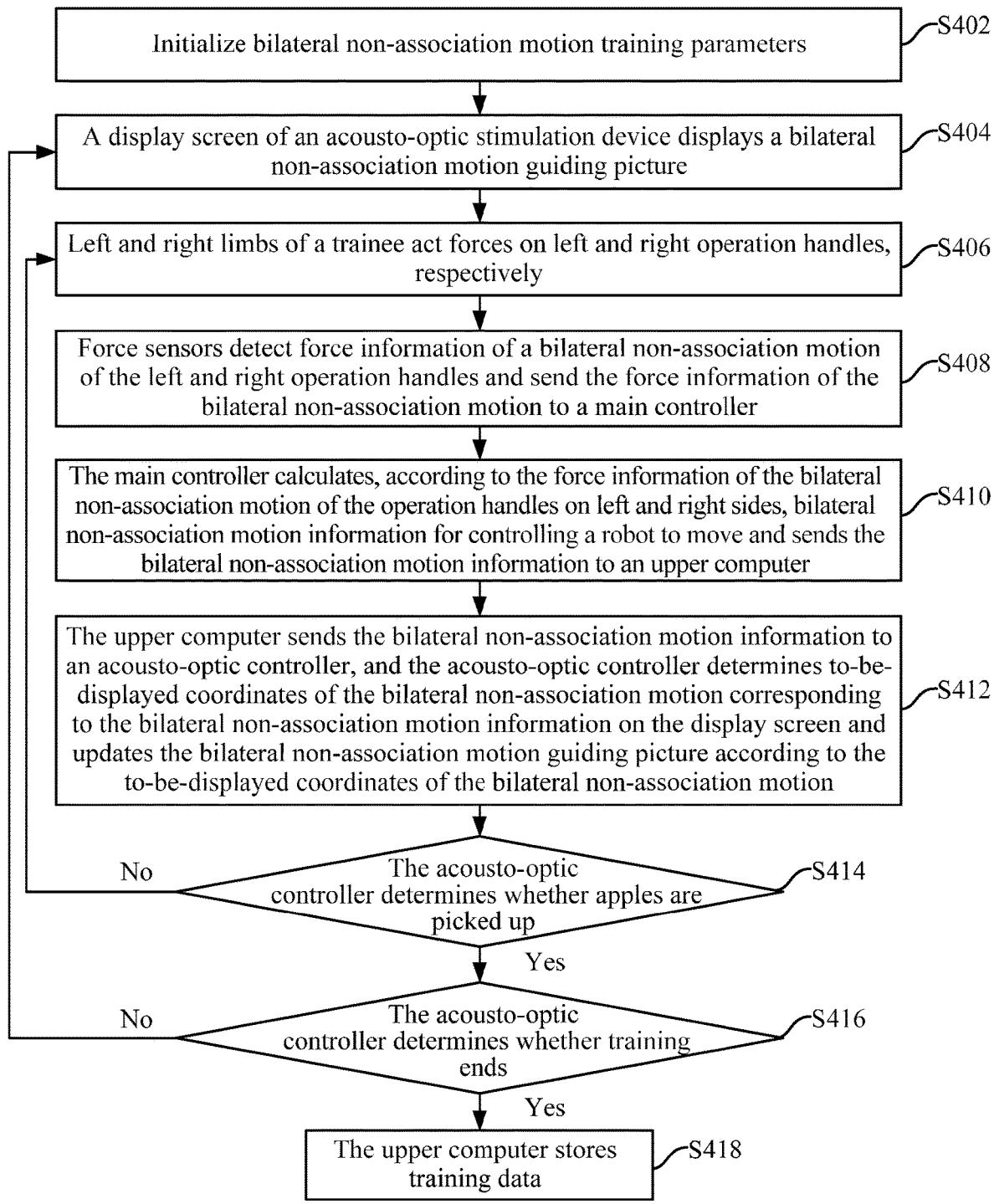
FIG. 4 is a control flowchart of bilateral non-association motion training performed by applying a bilateral limb coordination training system according to embodiment three of the present application.

FIG. 4 is a control flowchart of bilateral non-association motion training performed by applying a bilateral limb coordination training system according to embodiment three of the present application. As shown in FIGS. 4, S402 to S418 are included.

In S402, bilateral non-association motion training parameters are initialized.

The bilateral non-association motion training refers to the simulation of no association between operation handles 13011 on left and right sides in a process of bilateral coordination training.

An upper computer 140 presets training parameters corresponding to different motion modes. After a trainee selects a bilateral non-association motion mode on an initial display page of the upper computer 140, the upper computer 140 sends preset training parameters corresponding to the motion mode to an acousto-optic controller of an acousto-optic stimulation device 150 for the initialization of the bilateral non-association motion training parameters. The bilateral non-association motion training parameters may include positions from which two apples randomly fall and positions of two baskets and may also include training parameters such as a game difficulty coefficient, a game score, an accuracy rate and a game countdown.

In S404, a display screen of the acousto-optic stimulation device displays a bilateral non-association motion guiding picture.

The acousto-optic controller controls a speaker to play bilateral non-association motion guiding audio and controls the display screen to display the bilateral non-association motion guiding picture such that the trainee enters the corresponding bilateral non-association motion mode.

Images of two apples falling from random positions in a left half plane and a right half plane of an interface and images of the corresponding two baskets provided at the bottom of the left half plane and the bottom of the right half plane of the interface for picking up the apples are displayed in the bilateral non-association motion guiding picture. During the bilateral non-association motion training, the operation handles 13011 on the left and right sides are simulated as the two baskets displayed on the left and right in the bilateral non-association motion guiding picture.

Information such as the game difficulty coefficient, the game score, the accuracy rate and the game countdown may also be displayed in the bilateral non-association motion guiding picture.

In S406, left and right limbs of the trainee apply forces to the operation handles 13011 on the left and right sides, respectively.

The trainee prepares to move the baskets in the bilateral non-association motion guiding picture to below the corresponding falling apples according to the bilateral non-association motion guiding picture so as to pick up the apples. Therefore, forces need to be applied to the operation handles 13011 on the left and right sides of a three degree-of-freedom bilateral motion mechanism 1301 to drive the operation handles 13011 to move.

In S408, force sensors detect force information of a bilateral non-association motion of the left and right operation handles and send the force information of the bilateral non-association motion to a main controller.

The force information of the bilateral non-association motion includes magnitudes and directions of the forces of the bilateral non-association motion acted on the operation handles 13011.

The operation handles 13011 on the left and right sides are connected to a force sensor 110 on the left side and a force sensor 110 on the right side, respectively. The force sensor 110 may include a force sensor and a signal amplifier. The force sensor on the left side in the force sensor 110 on the left side sends the detected magnitude and direction of a force of the bilateral non-association motion acted on the operation handle 13011 on the left side to the main controller 120 via the signal amplifier on the left side. The force sensor on the right side in the force sensor 110 on the right side sends the detected magnitude and direction of a force of the bilateral non-association motion acted on the operation handle 13011 on the right side to the main controller 120 via the signal amplifier on the right side.

In S410, the main controller calculates, according to the force information of the bilateral non-association motion of the operation handles on the left and right sides, bilateral non-association motion information for controlling a robot to move and sends the bilateral non-association motion information to the upper computer.

The bilateral non-association motion information includes actual position coordinates of the operation handles 13011 and expected displacements and deviation displacements of the operation handles 13011.

For the operation handle 13011 on the left side, the upper computer 140 receives the actual position coordinates of the operation handle 13011 on the left side which are sent by the main controller 120 and sends the actual position coordinates of the operation handle 13011 on the left side to the acousto-optic controller in the acousto-optic stimulation device 150, and the acousto-optic controller calculates tobe-displayed coordinates of the bilateral non-association motion of the basket displayed on the left side in the display screen according to the actual position coordinates of the operation handle 13011 on the left side. In an embodiment, the to-be-displayed coordinates of the bilateral non-association motion may be current position coordinates of the basket displayed on the left side in the display screen. Then, the bilateral non-association motion guiding picture is updated according to the to-be-displayed coordinates of the bilateral non-association motion, that is, a current position of the basket on the left side in the display screen is updated according to the current position coordinates of the basket on the left side.

For the operation handle 13011 on the right side, the upper computer 140 receives the actual position coordinates of the operation handle 13011 on the right side which are sent by the main controller 120 and sends the actual position coordinates of the operation handle 13011 on the right side to the acousto-optic controller in the acousto-optic stimulation device 150, and the acousto-optic controller calculates to-be-displayed coordinates of the bilateral non-association motion of the basket displayed on the right side in the display screen according to the actual position coordinates of the operation handle 13011 on the right side. In an embodiment, the to-be-displayed coordinates of the bilateral non-association motion may be current position coordinates of the basket displayed on the right side in the display screen. Then, the bilateral non-association motion guiding picture is updated according to the to-be-displayed coordinates of the bilateral non-association motion, that is, a current position of the basket on the right side in the display screen is updated according to the current position coordinates of the basket on the right side.

The collision between the operation handles 13011 on the left and right sides may be detected by the following method: the main controller 120 obtains a left offset component of the operation handle 13011 on the left side relative to the origin of the corresponding coordinate system in the positive direction of the corresponding X-axis motion module 13013 according to the obtained deviation displacements of the operation handle 13011 on the left side, obtains a right offset component of the operation handle 13011 on the right side relative to the origin of the corresponding coordinate system in the positive direction of the corresponding X-axis motion module 13013 according to the obtained deviation displacements of the operation handle 13011 on the right side, and determines whether a sum of the left offset component and the right offset component is greater than a preset constant. If the sum of the left offset component and the right offset component is greater than the preset constant, it is determined that the collision occurs, and the main controller 120 controls neither of the operation handles 13011 on the left and right sides to move; otherwise, the operation handles 13011 on the left and right sides are controlled to move along the corresponding X-axis motion modules 13013, Y-axis motion modules 13014 and Z-axis motion modules 13015 according to the corresponding deviation displacements.

In S412, the upper computer sends the bilateral non-association motion information to the acousto-optic controller, and the acousto-optic controller determines to-be-displayed coordinates of the bilateral non-association motion corresponding to the bilateral non-association motion information on the display screen and updates the bilateral non-association motion guiding picture according to the to-be-displayed coordinates of the bilateral non-association motion.

For the operation handle 13011 on the left side, the upper computer 140 receives the actual position coordinates of the operation handle 13011 on the left side which are sent by the main controller 120 and sends the actual position coordinates of the operation handle 13011 on the left side to the acousto-optic controller in the acousto-optic stimulation device 150, and the acousto-optic controller calculates to-be-displayed coordinates of the bilateral non-association motion of the basket displayed on the left side in the display screen according to the actual position coordinates of the operation handle 13011 on the left side. Optionally, the to-be-displayed coordinates of the bilateral non-association motion may be current position coordinates of the basket displayed on the left side in the display screen. Then, the bilateral non-association motion guiding picture is updated according to the to-be-displayed coordinates of the bilateral non-association motion, that is, a current position of the basket on the left side in the display screen is updated according to the current position coordinates of the basket on the left side.

For the operation handle 13011 on the right side, the upper computer 140 receives the actual position coordinates of the operation handle 13011 on the right side which are sent by the main controller 120 and sends the actual position coordinates of the operation handle 13011 on the right side to the acousto-optic controller in the acousto-optic stimulation device 150, and the acousto-optic controller calculates to-be-displayed coordinates of the bilateral non-association motion of the basket displayed on the right side in the display screen according to the actual position coordinates of the operation handle 13011 on the right side. Optionally, the to-be-displayed coordinates of the bilateral non-association motion may be current position coordinates of the basket displayed on the right side in the display screen. Then, the bilateral non-association motion guiding picture is updated according to the to-be-displayed coordinates of the bilateral non-association motion, that is, a current position of the basket on the right side in the display screen is updated according to the current position coordinates of the basket on the right side.

The upper computer 140 receives the collision detection information sent by the main controller 120 and monitors the running safety of the bilateral limb coordination training system in real time according to the collision detection information.

In S414, the acousto-optic controller determines whether the apples are picked up. If so, S416 is performed. If not, S406 is performed.

The acousto-optic controller determines whether positions to which the apples finally fall are consistent with position coordinates of the corresponding baskets in the display screen. If they are consistent, it is determined that the apples are picked up and S416 is performed. Otherwise, S406 is performed.

In S416, the acousto-optic controller determines whether the training ends. If so, S418 is performed. If not, S404 is performed.

According to the preset training parameter, the game countdown, the acousto-optic controller determines that the bilateral non-association motion training ends when the countdown ends, and S418 is performed. Otherwise, S404 is performed.

In S418, the upper computer stores training data.

The training data stored by the upper computer 140 may include information about position coordinates from which the apples randomly fall, information about the position coordinates of the corresponding baskets in the display screen when the apples are picked up, and information such as the game score and the accuracy rate sent by the acousto-optic controller at the end of the training.

Figure 5:
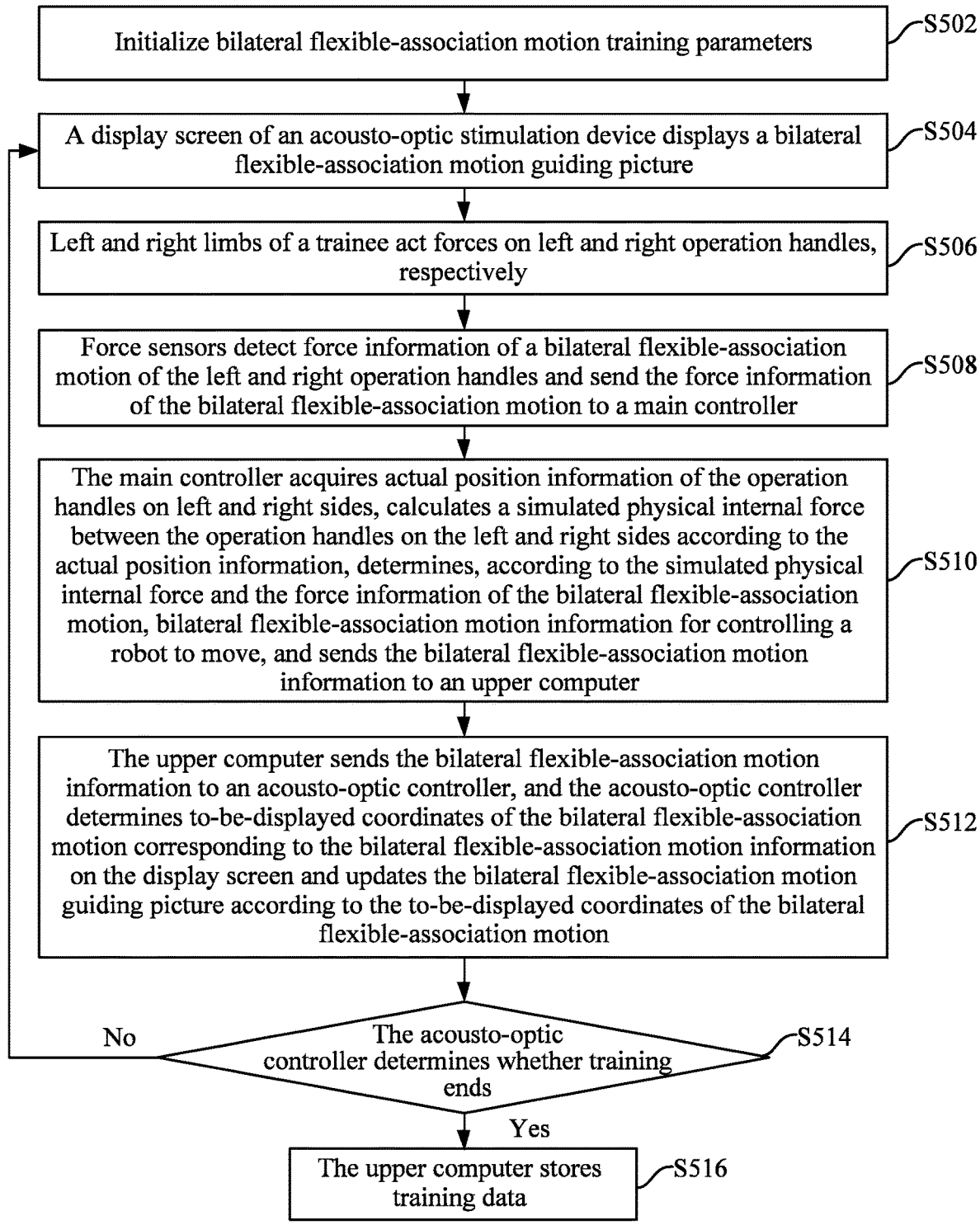
FIG. 5 is a control flowchart of bilateral flexible-association motion training performed by applying a bilateral limb coordination training system according to embodiment three of the present application.

FIG. 5 is a control flowchart of bilateral flexible-association motion training performed by applying a bilateral limb coordination training system according to embodiment three of the present application. As shown in FIGS. 5, S502 to S516 are included.

In S502, bilateral flexible-association motion training parameters are initialized.

The bilateral flexible-association motion training refers to the simulation of a flexible connection between the operation handles 13011 on the left and right sides in the process of bilateral coordination training. In an embodiment, a simulated object for flexibly connecting the left and right operation handles 13011 may be a spring.

The upper computer 140 presets the training parameters corresponding to the different motion modes. After the trainee selects a bilateral flexible-association motion mode on the initial display page of the upper computer 140, the upper computer 140 sends preset training parameters corresponding to the motion mode to the acousto-optic controller of the acousto-optic stimulation device 150 for the initialization of the bilateral flexible-association motion training parameters. The bilateral flexible-association motion training parameters may include an actual position of a simulated chest expander and pulling forces acted on two simulated handles in the corresponding simulated chest expander.

In S504, the display screen of the acousto-optic stimulation device displays a bilateral flexible-association motion guiding picture.

The acousto-optic controller controls the speaker to play bilateral flexible-association motion guiding audio and controls the display screen to display the bilateral flexible-association motion guiding picture such that the trainee enters the corresponding bilateral flexible-association motion mode.

The simulated chest expander in the interface is displayed in the bilateral flexible-association motion guiding picture. During the bilateral flexible-association motion training, the operation handles 13011 on the left and right sides in a bilateral coordination training robot 130 are simulated as the two simulated handles of the simulated chest expander displayed in the bilateral flexible-association motion guiding picture, where the two simulated handles on the left and right sides are connected through the simulated object. In an embodiment, the two simulated handles on the left and right sides may be connected through the spring.

The pulling forces acted on the two simulated handles on the left and right sides may also be displayed in the bilateral flexible-association motion guiding picture.

In S506, the left and right limbs of the trainee apply forces to the operation handles on the left and right sides, respectively.

The trainee performs the bilateral coordination training by stretching the spring in the bilateral flexible-association motion guiding picture according to the bilateral flexible-association motion guiding picture. Therefore, forces need to be applied to the operation handles 13011 on the left and right sides of the three degree-of-freedom bilateral motion mechanism 1301 to drive the operation handles 13011 to move.

In S508, the force sensors detect force information of a bilateral flexible-association motion of the operation handles on the left and right sides and send the force information of the bilateral flexible-association motion to the main controller.

The force information of the bilateral flexible-association motion includes magnitudes and directions of the forces of the bilateral flexible-association motion acted on the operation handles 13011.

The operation handles 13011 on the left and right sides are connected to the force sensor 110 on the left side and the force sensor 110 on the right side, respectively. The force sensor 110 may include the force sensor and the signal amplifier. The force sensor on the left side in the force sensor 110 on the left side sends the detected magnitude and direction of a force of the bilateral flexible-association motion acted on the operation handle 13011 on the left side to the main controller 120 via the signal amplifier on the left side. The force sensor on the right side in the force sensor 110 on the right side sends the detected magnitude and direction of a force of the bilateral flexible-association motion acted on the operation handle 13011 on the right side to the main controller 120 via the signal amplifier on the right side.

In S510, the main controller acquires actual position information of the operation handles 13011 on the left and right sides, calculates a simulated physical internal force between the operation handles 13011 on the left and right sides according to the actual position information, determines, according to the simulated physical internal force and the force information of the bilateral flexible-association motion, bilateral flexible-association motion information for controlling the robot to move, and sends the bilateral flexible-association motion information to the upper computer.

The bilateral flexible-association motion information includes actual position coordinates of the operation handles 13011 and expected displacements and deviation displacements of the operation handles 13011.

For the operation handle 13011 on the left side, after encoding of an encoder, the main controller 120 acquires actual position coordinates of the operation handle 13011 on the left side and calculates the simulated physical internal force applied by the simulated object to the operation handle 13011 on the left side according to the actual position information. In an embodiment, the simulated object may be the spring. Thus, the simulated physical internal force applied by the spring to the operation handle 13011 on the left side is obtained. Then, a resultant force acted on the operation handle 13011 on the left side is obtained according to the magnitude and the direction of the force of the bilateral flexible-association motion acted on the operation handle 13011 on the left side and the simulated physical internal force acted on the operation handle 13011 on the left side. A displacement differential of the operation handle 13011 on the left side is calculated by the admittance control method according to the resultant force. After the displacement differential is processed by the integrator, expected displacements of the operation handle 13011 on the left side along the corresponding X-axis motion module 13013, Y-axis motion module 13014 and Z-axis motion module 13015 under the magnitude and the direction of the current force of the bilateral flexible-association motion acted on the operation handle 13011 on the left side are obtained. Meanwhile, the main controller 120 acquires the actual position coordinates of the operation handle 13011 on the left side, obtains deviation displacements according to the actual position coordinates and the expected displacements of the operation handle 13011 on the left side, and detects the collision between the operation handles 13011 on the left and right sides based on the deviation displacements. If no collision occurs, the operation handle 13011 on the left side is controlled to move along the corresponding X-axis motion module 13013, Y-axis motion module 13014 and Z-axis motion module 13015 according to the corresponding deviation displacements. In the motion control process, the actual position coordinates of the operation handle 13011 on the left side which are acquired in real time, information about a pulling force acted on the operation handle 13011 on the left side, and collision detection information are sent to the upper computer 140.

Similarly, for the operation handle 13011 on the right side, after encoding of the encoder, the main controller 120 acquires actual position coordinates of the operation handle 13011 on the right side and calculates the simulated physical internal force applied by the simulated object to the operation handle 13011 on the right side according to the actual position information. In an embodiment, the simulated object may be the spring. Thus, the simulated physical internal force applied by the spring to the operation handle 13011 on the right side is obtained. Then, a resultant force acted on the operation handle 13011 on the right side is obtained according to the magnitude and the direction of the force of the bilateral flexible-association motion acted on the operation handle 13011 on the right side and the simulated physical internal force acted on the operation handle 13011 on the right side. A displacement differential of the operation handle 13011 on the right side is calculated by the admittance control method according to the resultant force. After the displacement differential is processed by the integrator, expected displacements of the operation handle 13011 on the right side along the corresponding X-axis motion module 13013, Y-axis motion module 13014 and Z-axis motion module 13015 under the magnitude and the direction of the current force of the bilateral flexible-association motion acted on the operation handle 13011 on the right side are obtained. Meanwhile, the main controller 120 acquires the actual position coordinates of the operation handle 13011 on the right side, obtains deviation displacements according to the actual position coordinates and the expected displacements of the operation handle 13011 on the right side, and detects the collision between the operation handles 13011 on the left and right sides based on the deviation displacements. If no collision occurs, the operation handle 13011 on the right side is controlled to move along the corresponding X-axis motion module 13013, Y-axis motion module 13014 and Z-axis motion module 13015 according to the corresponding deviation displacements. In the motion control process, the actual position coordinates of the operation handle 13011 on the right side which are acquired in real time, information about a pulling force acted on the operation handle 13011 on the right side, and the collision detection information are sent to the upper computer 140.

The collision between the operation handles 13011 on the left and right sides may be detected by the same method as that in a bilateral non-association motion.

For the operation handle 13011 on the left side, the upper computer 140 receives the actual position coordinates of the operation handle 13011 on the left side which are sent by the main controller 120 and sends the actual position coordinates of the operation handle 13011 on the left side to the acousto-optic controller in the acousto-optic stimulation device 150, and the acousto-optic controller calculates to-be-displayed coordinates of the bilateral flexible-association motion of the simulated handle displayed on the left side in the display screen according to the actual position coordinates of the operation handle 13011 on the left side. In an embodiment, the to-be-displayed coordinates of the bilateral flexible-association motion may be current position coordinates of the simulated handle displayed on the left side in the display screen. Then, the bilateral flexible-association motion guiding picture is updated according to the to-be-displayed coordinates of the bilateral flexible-association motion, that is, a current position of the simulated handle on the left side in the display screen is updated according to the current position coordinates of the simulated handle on the left side.

Similarly, for the operation handle 13011 on the right side, the upper computer 140 receives the actual position coordinates of the operation handle 13011 on the right side which are sent by the main controller 120 and sends the actual position coordinates of the operation handle 13011 on the right side to the acousto-optic controller in the acousto-optic stimulation device 150, and the acousto-optic controller calculates to-be-displayed coordinates of the bilateral flexible-association motion of the simulated handle displayed on the right side in the display screen according to the actual position coordinates of the operation handle 13011 on the right side. In an embodiment, the to-be-displayed coordinates of the bilateral flexible-association motion may be current position coordinates of the simulated handle displayed on the right side in the display screen. Then, the bilateral flexible-association motion guiding picture is updated according to the to-be-displayed coordinates of the bilateral flexible-association motion, that is, a current position of the simulated handle on the right side in the display screen is updated according to the current position coordinates of the simulated handle on the right side.

Similarly, for the operation handle 13011 on the right side, the upper computer 140 receives the actual position coordinates of the operation handle 13011 on the right side which are sent by the main controller 120 and sends the actual position coordinates of the operation handle 13011 on the right side to the acousto-optic controller in the acousto-optic stimulation device 150, and the acousto-optic controller calculates to-be-displayed coordinates of the bilateral flexible-association motion of the simulated handle displayed on the right side in the display screen according to the actual position coordinates of the operation handle 13011 on the right side. Optionally, the to-be-displayed coordinates of the bilateral flexible-association motion may be current position coordinates of the simulated handle displayed on the right side in the display screen. Then, the bilateral flexible-association motion guiding picture is updated according to the to-be-displayed coordinates of the bilateral flexible-association motion, that is, a current position of the simulated handle on the right side in the display screen is updated according to the current position coordinates of the simulated handle on the right side.

The upper computer 140 may also send information about the pulling forces acted on the operation handles 13011 on the left and right sides and sent by the main controller 120 to the acousto-optic controller, and the acousto-optic controller controls the display screen to display the information about the pulling forces in correspondence to the to-be-displayed coordinates of the bilateral flexible-association motion.

The upper computer 140 receives the collision detection information sent by the main controller 120 and monitors the running safety of the bilateral limb coordination training system in real time according to the collision detection information.

In S514, the acousto-optic controller determines whether the training ends. If so, S516 is performed. If not, S504 is performed.

According to the preset training parameter, the game countdown, the acousto-optic controller determines that the bilateral flexible-association motion training ends when the countdown ends, and S516 is performed. Otherwise, S504 is performed.

In S516, the upper computer stores training data.

The training data stored by the upper computer 140 may include information about real-time position coordinates of the left and right simulated handles and information about pulling forces acted on the left and right simulated handles and corresponding to the information about real-time position coordinates.

Figure 6:
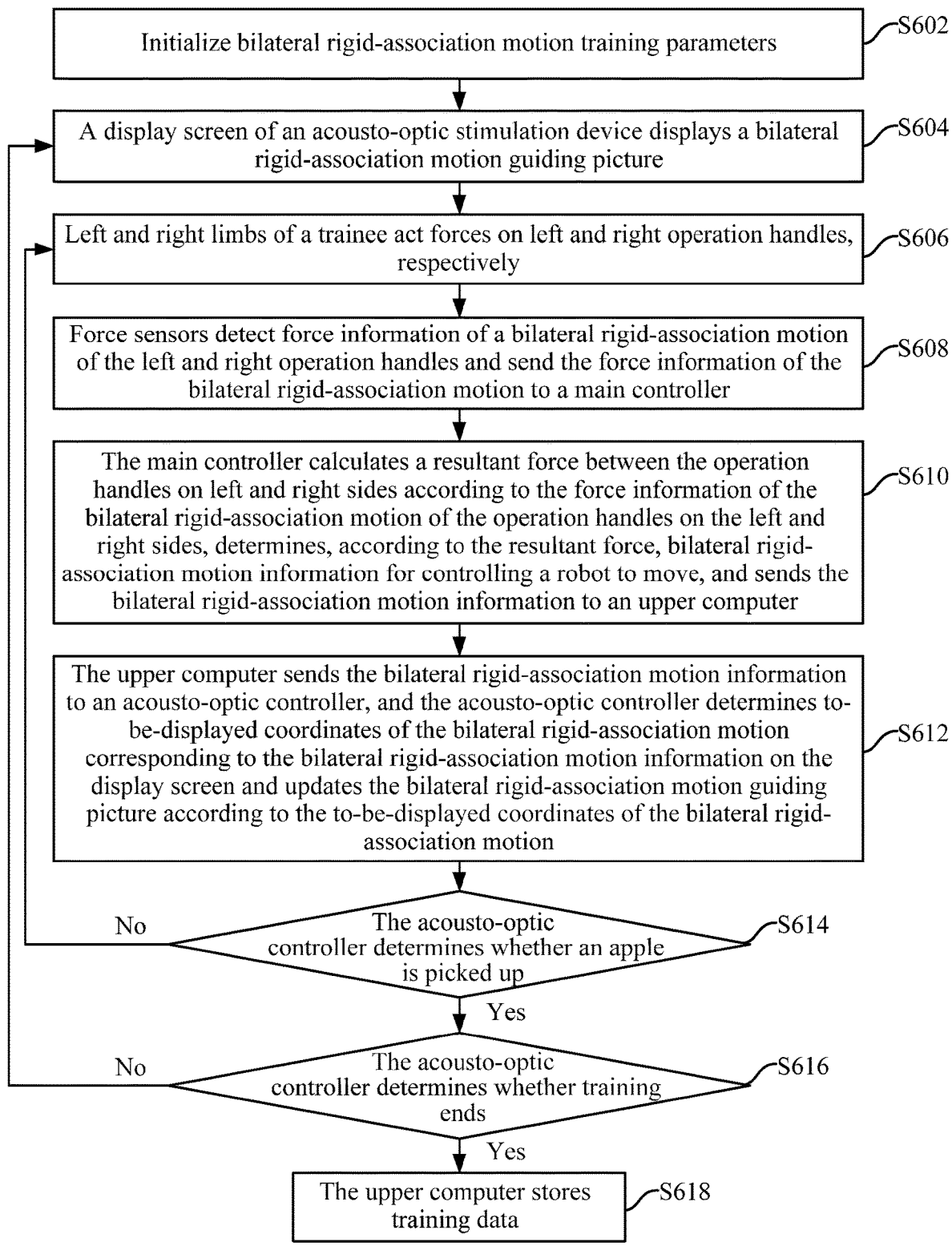
FIG. 6 is a control flowchart of bilateral rigid-association motion training performed by applying a bilateral limb coordination training system according to embodiment three of the present application.

FIG. 6 is a control flowchart of bilateral rigid-association motion training performed by applying a bilateral limb coordination training system according to embodiment three of the present application. As shown in FIGS. 6, S602 to S618 are included.

In S602, bilateral rigid-association motion training parameters are initialized.

The bilateral rigid-association motion training refers to the simulation of a rigid connection between the operation handles 13011 on the left and right sides in the process of bilateral coordination training, and relative positions of the operation handles 13011 on the left and right sides remain unchanged.

After the trainee selects a bilateral rigid-association motion mode on the initial display page of the upper computer 140, the upper computer 140 sends preset training parameters corresponding to the motion mode to the acousto-optic controller of the acousto-optic stimulation device 150 for the initialization of the bilateral rigid-association motion training parameters. The bilateral rigid-association motion training parameters may include a position from which one apple randomly falls and a position of the corresponding one basket and may also include training parameters such as the game difficulty coefficient, the game score, the accuracy rate and the game countdown.

In S604, the display screen of the acousto-optic stimulation device displays a bilateral rigid-association motion guiding picture.

The acousto-optic controller controls the speaker to play bilateral rigid-association motion guiding audio and controls the display screen to display the bilateral rigid-association motion guiding picture such that the trainee enters the corresponding bilateral rigid-association motion mode.

An image of one apple falling from a random position in the interface and an image of the corresponding one basket provided at the bottom of the interface for picking up the apple are displayed in the bilateral rigid-association motion guiding picture. During the bilateral rigid-association motion training, a rigid association between the operation handles 13011 on the left and right sides is simulated as the one basket displayed in the bilateral rigid-association motion guiding picture.

Information such as the game difficulty coefficient, the game score, the accuracy rate and the game countdown may also be displayed in the bilateral rigid-association motion guiding picture.

In S606, the left and right limbs of the trainee apply forces to the operation handles on the left and right sides, respectively.

The trainee prepares to move the basket in the bilateral rigid-association motion guiding picture to below the corresponding falling apple according to the bilateral rigid-association motion guiding picture so as to pick up the apple. Therefore, forces need to be applied to the operation handles 13011 on the left and right sides of the three degree-of-freedom bilateral motion mechanism 1301 to drive the operation handles 13011 to move.

In S608, the force sensors detect force information of a bilateral rigid-association motion of the operation handles on the left and right sides and send the force information of the bilateral rigid-association motion to the main controller.

The force information of the bilateral rigid-association motion includes magnitudes and directions of the forces of the bilateral rigid-association motion acted on the operation handles 13011.

The operation handles 13011 on the left and right sides are connected to the force sensor 110 on the left side and the force sensor 110 on the right side, respectively. The force sensor 110 may include the force sensor and the signal amplifier. The force sensor on the left side in the force sensor 110 on the left side sends the detected magnitude and direction of a force of the bilateral rigid-association motion acted on the operation handle 13011 on the left side to the main controller 120 via the signal amplifier on the left side. The force sensor on the right side in the force sensor 110 on the right side sends the detected magnitude and direction of a force of the bilateral rigid-association motion acted on the operation handle 13011 on the right side to the main controller 120 via the signal amplifier on the right side.

In S610, the main controller calculates a resultant force between the operation handles on the left and right sides according to the force information of the bilateral rigid-association motion of the operation handles on the left and right sides, determines, according to the resultant force, bilateral rigid-association motion information for controlling the robot to move, and sends the bilateral rigid-association motion information to the upper computer.

The bilateral rigid-association motion information includes actual position coordinates of the operation handles 13011 and expected displacements and deviation displacements of the operation handles 13011.

Due to the rigid association between the operation handles 13011 on the left and right sides, the main controller 120 calculates the resultant force acted on the operation handles 13011 on the left and right sides according to the magnitude and the direction of the force of the bilateral rigid-association motion acted on the operation handle 13011 on the left side and the magnitude and the direction of the force of the bilateral rigid-association motion acted on the operation handle 13011 on the right side, separately. Then, a displacement differential of the operation handles 13011 on the left and right sides is calculated by the admittance control method according to the resultant force acted on the operation handles 13011 on the left and right sides. After the displacement differential is processed by the integrator, the expected displacements of the operation handles 13011 on the left and right sides along their respective X-axis motion modules 13013, Y-axis motion modules 13014 and Z-axis motion modules 13015 under the current resultant force are obtained. Meanwhile, the main controller 120 acquires the actual position coordinates of the operation handles 13011 on the left and right sides, obtains the deviation displacements according to the actual position coordinates and the expected displacements of the operation handles 13011 on the left and right sides, and detects the collision between the operation handles 13011 on the left and right sides based on the deviation displacements. If no collision occurs, the operation handles 13011 on the left and right sides are controlled to move along their respective X-axis motion modules 13013, Y-axis motion modules 13014 and Z-axis motion modules 13015 according to the same deviation displacements. In the motion control process, the actual position coordinates of the operation handles 13011 on the left and right sides which are acquired in real time and collision detection information are sent to the upper computer 140.

The collision between the operation handles 13011 on the left and right sides may be detected by the same method as that in a bilateral non-association motion.

In S612, the upper computer sends the bilateral rigid-association motion information to the acousto-optic controller, and the acousto-optic controller determines to-be-displayed coordinates of the bilateral rigid-association motion corresponding to the bilateral rigid-association motion information on the display screen and updates the bilateral rigid-association motion guiding picture according to the to-be-displayed coordinates of the bilateral rigid-association motion.

The upper computer 140 receives the actual position coordinates of the operation handles 13011 on the left and right sides which are sent by the main controller 120 and sends the actual position coordinates of the operation handles 13011 on the left and right sides to the acousto-optic controller in the acousto-optic stimulation device 150, and the acousto-optic controller calculates the to-be-displayed coordinates of the bilateral rigid-association motion of the basket displayed in the display screen according to the actual position coordinates of the operation handles 13011 on the left and right sides. The to-be-displayed coordinates of the bilateral rigid-association motion may be current position coordinates of a leftmost end and a rightmost end of the basket displayed in the display screen. Then, the bilateral rigid-association motion guiding picture is updated according to the to-be-displayed coordinates of the bilateral rigid-association motion, that is, a current position of the basket in the display screen is updated.

The upper computer 140 receives the collision detection information sent by the main controller 120 and monitors the running safety of the bilateral limb coordination training system in real time according to the collision detection information.

In S614, the acousto-optic controller determines whether the apple is picked up. If so, S616 is performed. If not, S606 is performed.

The acousto-optic controller determines whether a position to which the apple finally falls is between positions of the leftmost end and the rightmost end of the basket in the display screen. If so, it is determined that the apple is picked up and S616 is performed. Otherwise, S606 is performed.

In S616, the acousto-optic controller determines whether the training ends. If so, S618 is performed. If not, S606 is performed.

According to the preset training parameter, the game countdown, the acousto-optic controller determines that the bilateral rigid-association motion training ends when the countdown ends, and S618 is performed. Otherwise, S606 is performed.

In S618, the upper computer stores training data.

The training data stored by the upper computer 140 may include information about position coordinates from which the apple randomly falls, information about position coordinates of the leftmost end and the rightmost end of the corresponding basket in the display screen when the apple is picked up, and information such as the game score and the accuracy rate sent by the acousto-optic controller at the end of the training.

Three training modes provided in the embodiments of the present application not only enable ordinary people to perform limb coordination training so as to improve a bilateral limb coordination capability but also enable people having limb motor dysfunction to perform rehabilitation training. A trainee having motor dysfunction of both left and right limbs can perform active rehabilitation training in any one of the three training modes. A trainee having motor dysfunction of a single limb can perform rehabilitation training in a bilateral rigid-association motion training mode where a normal limb drives an affected limb. Additionally, the professional can effectively evaluate a training effect of a trainee according to the stored training data of the trainee.

Embodiment Four

Figure 7:
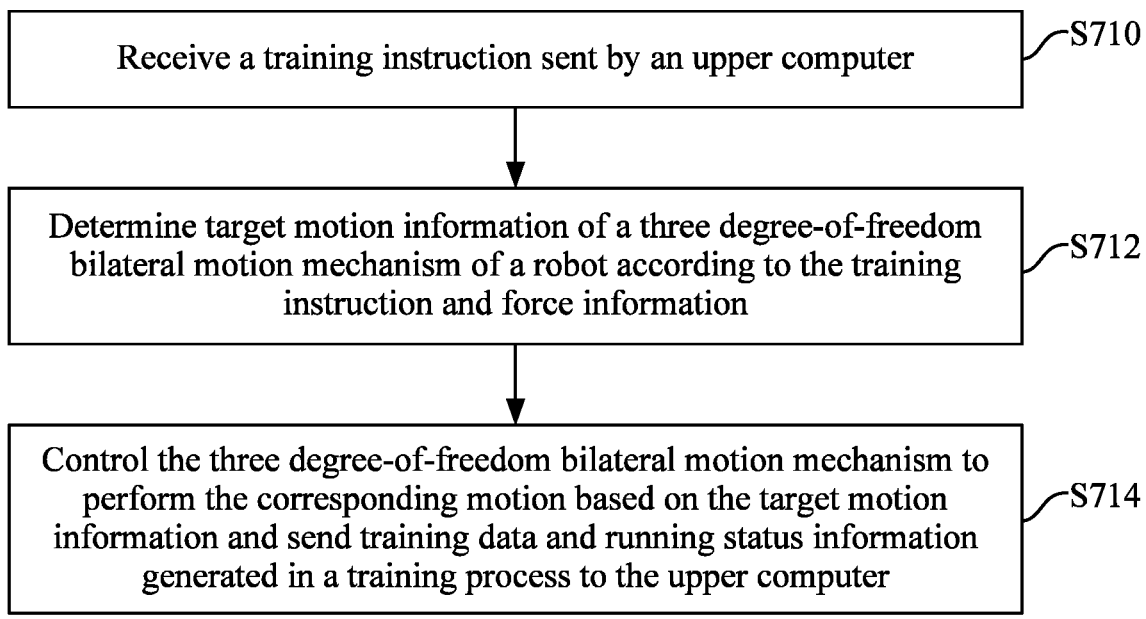
FIG. 7 is a flowchart of a bilateral limb coordination training control method according to embodiment four of the present application.

FIG. 7 is a flowchart of a bilateral limb coordination training control method according to embodiment four of the present application. As shown in FIGS. 7, S710 to S714 are included.

In S710, a training instruction sent by an upper computer is received.

The training instruction includes a bilateral non-association motion training instruction, a bilateral flexible-association motion training instruction or a bilateral rigid-association motion training instruction.

The upper computer 140 provides a user with a motion mode selection interface, where three motion modes are included, which are a bilateral non-association motion, a bilateral flexible-association motion or a bilateral rigid-association motion, separately. After the user selects one motion mode according to a requirement or a preference of the user, the upper computer 140 generates the corresponding training instruction and sends the training instruction to a main controller 120.

In S712, target motion information of a three degree-of-freedom bilateral motion mechanism of a robot is determined according to the training instruction and force information.

When the training instruction is the bilateral non-association motion training instruction, the main controller 120 acquires force information of the bilateral non-association motion sent by a force sensor 110 and obtains bilateral non-association motion information according to the force information of the bilateral non-association motion.

In the bilateral non-association motion, no association exists between operation handles 13011 on left and right sides in the three degree-of-freedom bilateral motion mechanism 1301. The main controller 120 acquires the force information of the bilateral non-association motion of the operation handles 13011 on the left and right sides in the three degree-of-freedom bilateral motion mechanism 1301, separately, the force information being sent by the force sensor 110. Displacement differentials of the operation handles 13011 on the left and right sides are calculated by an admittance control method according to the force information of the bilateral non-association motion of the operation handles 13011 on the left and right sides, separately. After the displacement differentials are further processed by an integrator, expected displacements corresponding to the operation handles 13011 on the left and right sides are obtained. Meanwhile, the main controller 120 acquires respective actual position coordinates of the operation handles 13011 on the left and right sides after encoding of an encoder and calculates deviation displacements corresponding to the operation handles 13011 on the left and right sides according to the corresponding actual position coordinates and expected displacements of the operation handles 13011 on the left and right sides.

When the training instruction is the bilateral flexible-association motion training instruction, the main controller 120 acquires actual position information of the three degree-of-freedom bilateral motion mechanism 1301 and force information of the bilateral flexible-association motion sent by the force sensor 110; the main controller 120 calculates a simulated physical internal force acted on the three degree-of-freedom bilateral motion mechanism according to the actual position information; and the main controller 120 obtains bilateral flexible-association motion information according to the simulated physical internal force and the force information of the bilateral flexible-association motion.

In the bilateral flexible-association motion, a flexible connection exists between the operation handles 13011 on the left and right sides in the three degree-of-freedom bilateral motion mechanism 1301. In an embodiment, a simulated object for flexibly connecting the operation handles 13011 on the left and right sides may be a spring. The main controller 120 acquires the force information of the bilateral flexible-association motion of the operation handles 13011 on the left and right sides in the three degree-of-freedom bilateral motion mechanism 1301, separately, the force information being sent by the force sensor 110. Meanwhile, the main controller 120 acquires respective actual position coordinates of the operation handles 13011 on the left and right sides after encoding of the encoder and calculates the simulated physical internal force applied by the simulated object for connecting the operation handles 13011 on the left and right sides to the two handles according to the respective actual position coordinates of the operation handles 13011 on the left and right sides. The simulated physical internal force applied by the simulated object for connecting the operation handles 13011 on the left and right sides to the two handles may be a simulated physical internal force applied by the spring to the operation handles 13011 on the left and right sides. Then, information about resultant forces acted on the operation handles 13011 on the left and right sides is calculated according to the simulated physical internal force and the force information of the bilateral flexible-association motion of the operation handles 13011 on the left and right sides, respective displacement differentials of the operation handles 13011 on the left and right sides are calculated by the admittance control method according to the information about the resultant forces, and expected displacements corresponding to the operation handles 13011 on the left and right sides are obtained after the displacement differentials are processed by the integrator. Deviation displacements corresponding to the operation handles 13011 on the left and right sides are calculated according to the corresponding actual position coordinates and expected displacements of the operation handles 13011 on the left and right sides.

In an embodiment, when the training instruction is the bilateral rigid-association motion training instruction, the main controller 120 acquires force information of the bilateral rigid-association motion sent by the force sensor 110; the main controller 120 calculates information about a resultant force acted on the three degree-of-freedom bilateral motion mechanism 1301 according to the force information of the bilateral rigid-association motion; and the main controller 120 obtains bilateral rigid-association motion information according to the information about the resultant force. In the bilateral rigid-association motion, a rigid connection exists between the operation handles 13011 on the left and right sides in the three degree-of-freedom bilateral motion mechanism 1301, that is, relative positions of the operation handles 13011 on the left and right sides remain unchanged. The main controller 120 acquires the force information of the bilateral rigid-association motion of the operation handles 13011 on the left and right sides in the three degree-of-freedom bilateral motion mechanism 1301, separately, the force information being sent by the force sensor 110. The main controller 120 calculates the resultant force acted on the operation handles 13011 on the left and right sides according to the force information of the bilateral rigid-association motion of the two handles. Then, the same displacement differentials of the operation handles 13011 on the left and right sides are calculated by the admittance control method according to the resultant force acted on the operation handles 13011 on the left and right sides, and the same expected displacements corresponding to the operation handles 13011 on the left and right sides under the current resultant force are obtained after the displacement differentials are processed by the integrator. Meanwhile, the main controller 120 acquires actual position coordinates of the operation handles 13011 on the left and right sides after encoding of the encoder and obtains the same deviation displacements of the operation handles 13011 on the left and right sides according to the actual position coordinates and the expected displacements of the operation handles 13011 on the left and right sides.

In the bilateral rigid-association motion, a rigid connection exists between the operation handles 13011 on the left and right sides in the three degree-of-freedom bilateral motion mechanism 1301, that is, relative positions of the operation handles 13011 on the left and right sides remain unchanged. The main controller 120 acquires the force information of the bilateral rigid-association motion of the operation handles 13011 on the left and right sides in the three degree-of-freedom bilateral motion mechanism 1301, separately, the force information being sent by the force sensor 110. The main controller 120 calculates the resultant force acted on the operation handles 13011 on the left and right sides according to the force information of the bilateral rigid-association motion of the two handles. Then, the same displacement differentials of the operation handles 13011 on the left and right sides are calculated by the admittance control method according to the resultant force acted on the operation handles 13011 on the left and right sides, and the same expected displacements corresponding to the operation handles 13011 on the left and right sides under the current resultant force are obtained after the displacement differentials are processed by the integrator. Meanwhile, the main controller 120 acquires actual position coordinates of the operation handles 13011 on the left and right sides after encoding of the encoder and obtains the same deviation displacements of the operation handles 13011 on the left and right sides according to the actual position coordinates and the expected displacements of the operation handles 13011 on the left and right sides.

In S714, the three degree-of-freedom bilateral motion mechanism is controlled to perform the corresponding motion based on the target motion information and training data and running status information generated in a training process are sent to the upper computer.

The main controller 120 controls, according to the bilateral non-association motion information, the bilateral flexible-association motion information or the bilateral rigid-association motion information, the three degree-of-freedom bilateral motion mechanism 1301 to perform the corresponding motion and sends the training data and the running status information generated in a process of bilateral non-association motion training, bilateral flexible-association motion training or bilateral rigid-association motion training to the upper computer 140.

Based on the preceding embodiment, when the bilateral non-association motion is performed, the main controller 120 obtains the deviation displacements corresponding to the operation handles 13011 on the left and right sides and detects a collision between the operation handles 13011 on the left and right sides based on the two deviation displacements. If no collision occurs, the operation handles 13011 on the left and right sides are controlled to move according to their respective deviation displacements. In a bilateral non-association motion control process, the main controller 120 sends the actual position coordinates of the operation handles 13011 on the left and right sides which are acquired in real time and collision detection information to the upper computer 140.

Based on the preceding embodiment, when the bilateral flexible-association motion is performed, the main controller 120 obtains the deviation displacements corresponding to the operation handles 13011 on the left and right sides and detects the collision between the operation handles 13011 on the left and right sides based on the two deviation displacements. If no collision occurs, the operation handles 13011 on the left and right sides are controlled to move according to their respective deviation displacements. In a bilateral flexible-association motion control process, the main controller 120 sends the actual position coordinates of the operation handles 13011 on the left and right sides which are acquired in real time, information about pulling forces acted on the operation handles 13011 on the left and right sides and corresponding to the actual position coordinates, and collision detection information to the upper computer 140.

Based on the preceding embodiment, when the bilateral rigid-association motion is performed, the main controller 120 obtains the same deviation displacements of the operation handles 13011 on the left and right sides and detects the collision between the operation handles 13011 on the left and right sides based on the deviation displacements. If no collision occurs, the operation handles 13011 on the left and right sides are controlled to move according to the same deviation displacements. In a bilateral rigid-association motion control process, the main controller 120 sends the actual position coordinates of the operation handles 13011 on the left and right sides which are acquired in real time and collision detection information to the upper computer 140.

It is to be noted that based on the preceding embodiment, in the case where the bilateral non-association motion, the bilateral flexible-association motion or the bilateral rigid-association motion is controlled, when the collision between the operation handles 13011 on the left and right sides is detected according to the deviation displacements, it is necessary to detect not only whether the collision occurs between the relative positions of the operation handles 13011 on the left and right sides after the motion based on the deviation displacements but also whether the operation handles 13011 on the left and right sides move within the safety range of a bilateral coordination training robot.

According to the embodiment of the present application, the corresponding control strategies are determined according to different training instructions so that the robot is controlled to implement the bilateral non-association motion, the bilateral flexible-association motion or the bilateral rigid-association motion. The completion of one task with both hands in daily life is generally a collection of three motion modes, and a selection is made from three training modes according to the needs of the trainee so that more targeted coordination training can be completed.

According to the embodiment of the present application, the robot provided with the three degree-of-freedom bilateral motion mechanism is connected to the force sensor and the main controller, and the main controller determines the target motion information of the three degree-of-freedom bilateral motion mechanism according to the force information of the three degree-of-freedom bilateral motion mechanism detected by the force sensor and controls the three degree-of-freedom bilateral motion mechanism to move based on the target motion information. The present application solves the problem of a lack of equipment applicable to the bilateral coordination training of all people and not only enables people having limb motor dysfunction to perform rehabilitation training and bilateral coordination training so as to reconstruct brain functions but also enables ordinary people to perform bilateral limb coordination training so as to improve a limb coordination motion capability and develop brain areas.

What is claimed is:

1. A bilateral limb coordination training system, comprising: a main controller, force sensors, a robot and an upper computer, wherein the main controller is connected to the force sensors and the robot, separately;

the robot comprises a base, a position adjustment mechanism fixed to the base and a three degree-of-freedom bilateral motion mechanism, wherein the three degree-of-freedom bilateral motion mechanism is coupled to the position adjustment mechanism through a metal plate and comprises a pair of X-axis motion modules, a pair of Y-axis motion modules, a pair of Z-axis motion modules, support stages and end effectors, wherein each of the support stages is connected by screws to an end of a respective one of the Z-axis motion modules, and each of the end effectors is connected by screws to an end of a respective one of the Z-axis motion modules;

the force sensors are connected to the three degree-of-freedom bilateral motion mechanism and configured to detect force information of the three degree-of-freedom bilateral motion mechanism and send the force information to the main controller; and the force sensors are connected in one-to-one correspondence to the end effectors and each of the force sensors is configured to detect a magnitude and a direction of a force acted on a respective one of the end effectors during bilateral limb training;

the main controller is configured to determine target motion information of the three degree-of-freedom bilateral motion mechanism according to the force information and control the three degree-of-freedom bilateral motion mechanism to move based on the target motion information, wherein the main controller is configured to determine a motion displacement of each of the X-axis motion modules, a motion displacement of each of the Y-axis motion modules and a motion displacement of each of the Z-axis motion modules according to the magnitude and the direction of the force acted on the respective one of the end effectors that are fed back by each of the force sensors, and control each of the X-axis motion modules, each of the Y-axis motion modules and each of the Z-axis motion modules to move according to corresponding motion displacements; and the upper computer is configured to deliver different training instructions to the main controller to wake up the main controller and further configured to receive training data and running status information fed back by the main controller, wherein one training instruction comprises a bilateral non-association motion training instruction, a bilateral flexible-association motion training instruction or a bilateral rigid-association motion training instruction.

2. The system according to claim 1, wherein the position adjustment mechanism comprises a lifting column and an electric push rod, wherein
the lifting column is fixed to the base and is coupled to the metal plate, and the lifting column is configured to adjust a height of the three degree-of-freedom bilateral motion mechanism; and
the electric push rod is disposed on a bottom surface of the three degree-of-freedom bilateral motion mechanism, and the electric push rod is configured to adjust an angle at which the three degree-of-freedom bilateral motion mechanism is inclined.

3. The system according to claim 1, further comprising: an acousto-optic stimulation device;
wherein the acousto-optic stimulation device is connected to the upper computer and configured to provide a trainee with audio and image information such that the trainee performs bilateral coordination training with the robot according to the audio and image information; and the acousto-optic stimulation device is further configured to receive current motion information of the robot fed back by the upper computer and display the current motion information in an image form.

4. The system according to claim 3, wherein the acousto-optic stimulation device comprises an acousto-optic controller comprising a speaker and a display screen and connected to the upper computer, wherein
the acousto-optic controller is configured to control the speaker to play bilateral non-association motion guiding audio and control the display screen to display a bilateral non-association motion guiding picture such that the trainee enters a corresponding bilateral non-association motion mode;
the upper computer is configured to receive bilateral non-association motion information sent by the main controller and send the bilateral non-association motion information to the acousto-optic controller, wherein the bilateral non-association motion information is obtained by the main controller according to force information of a bilateral non-association motion of the trainee in the bilateral non-association motion mode; and
the acousto-optic controller is further configured to receive the bilateral non-association motion information, determine to-be-displayed coordinates of the bilateral non-association motion corresponding to the bilateral non-association motion information on the display screen, and update the bilateral non-association motion guiding picture according to the to-be-displayed coordinates of the bilateral non-association motion.

5. The system according to claim 4, wherein
the acousto-optic controller is configured to control the speaker to play bilateral flexible-association motion guiding audio and control the display screen to display a bilateral flexible-association motion guiding picture such that the trainee enters a corresponding bilateral flexible-association motion mode;
the upper computer is configured to receive bilateral flexible-association motion information sent by the main controller and send the bilateral flexible-association motion information to the acousto-optic controller, wherein the bilateral flexible-association motion information is obtained by the main controller according to force information of a bilateral flexible-association motion of the trainee in the bilateral flexible-association motion mode; and
the acousto-optic controller is further configured to receive the bilateral flexible-association motion information, determine to-be-displayed coordinates of the bilateral flexible-association motion corresponding to the bilateral flexible-association motion information on the display screen, and update the bilateral flexible-association motion guiding picture according to the to-be-displayed coordinates of the bilateral flexible-association motion.

6. The system according to claim 4, wherein
the acousto-optic controller is configured to control the speaker to play bilateral rigid-association motion guiding audio and control the display screen to display a bilateral rigid-association motion guiding picture such that the trainee enters a corresponding bilateral rigid-association motion mode;
the upper computer is configured to receive bilateral rigid-association motion information sent by the main controller and send the bilateral rigid-association motion information to the acousto-optic controller, wherein the bilateral rigid-association motion information is obtained by the main controller according to force information of a bilateral rigid-association motion of the trainee in the bilateral rigid-association motion mode; and
the acousto-optic controller is further configured to receive the bilateral rigid-association motion information, determine to-be-displayed coordinates of the bilateral rigid-association motion corresponding to the bilateral rigid-association motion information on the display screen, and update the bilateral rigid-association motion guiding picture according to the to-be-displayed coordinates of the bilateral rigid-association motion.

7. A bilateral limb coordination training control method, applied by the main controller in the bilateral limb coordination training system according to claim 1 and comprising:
receiving, a training instruction sent by the upper computer, wherein the training instruction comprises a bilateral non-association motion training instruction, a bilateral flexible-association motion training instruction or a bilateral rigid-association motion training instruction;
determining target motion information of the three degree-of-freedom bilateral motion mechanism of the robot according to the training instruction; and
controlling the three degree-of-freedom bilateral motion mechanism to perform a corresponding motion based on the target motion information and send training data and running status information generated during training to the upper computer.

8. The method according to claim 7, wherein determining, by the main controller, the target motion information of the three degree-of-freedom bilateral motion mechanism of the robot according to the training instruction comprises:
in response to the training instruction being the bilateral non-association motion training instruction, acquiring force information of a bilateral non-association motion sent by the force sensors; and
obtaining bilateral non-association motion information according to the force information of the bilateral non-association motion.

9. The method according to claim 7, wherein determining, by the main controller, the target motion information of the three degree-of-freedom bilateral motion mechanism of the robot according to the training instruction comprises:
- in response to the training instruction being the bilateral flexible-association motion training instruction, acquiring actual position information of the three degree-of-freedom bilateral motion mechanism and force information of a bilateral flexible-association motion sent by the force sensors;
- calculating a simulated physical internal force acted on the three degree-of-freedom bilateral motion mechanism according to the actual position information; and
- obtaining bilateral flexible-association motion information according to the simulated physical internal force and the force information of the bilateral flexible-association motion.

10. The method according to claim 7, wherein determining, by the main controller, the target motion information of the three degree-of-freedom bilateral motion mechanism of the robot according to the training instruction comprises:
- in response to the training instruction being the bilateral rigid-association motion training instruction, acquiring force information of a bilateral rigid-association motion sent by the force sensors;
- calculating information about a resultant force acted on the three degree-of-freedom bilateral motion mechanism according to the force information of the bilateral rigid-association motion; and
- obtaining bilateral rigid-association motion information according to the information about the resultant force.

* * * * *